United States Patent
Hart et al.

(10) Patent No.: US 6,575,064 B2
(45) Date of Patent: Jun. 10, 2003

(54) METHOD AND APPARATUS FOR CUTTING ELASTOMERIC MATERIALS

(75) Inventors: James Michael Hart, Akron, OH (US); James Alfred Benzing, II, North Canton, OH (US)

(73) Assignee: The Goodyear & Rubber Company, Akron, OH (US)

( * ) Notice: Subject to any disclaimer, the term of this patent is extended or adjusted under 35 U.S.C. 154(b) by 0 days.

(21) Appl. No.: 10/226,886

(22) Filed: Aug. 23, 2002

(65) Prior Publication Data

US 2003/0010168 A1 Jan. 16, 2003

Related U.S. Application Data

(62) Division of application No. 09/762,549, filed as application No. PCT/US98/22548 on Oct. 20, 1998, now Pat. No. 6,510,773.

(51) Int. Cl.[7] .............................. B26D 7/10; B26D 3/00; B26F 1/24
(52) U.S. Cl. .................. 83/16; 83/30; 83/39; 83/56; 83/951
(58) Field of Search .................. 83/16, 30, 39, 83/56, 171, 951, 175, 282, 453, 517, 613, 614, 623, 701, 513, 554, 555, 561, 587, 618, 639

(56) References Cited

U.S. PATENT DOCUMENTS

| 833,572 A | 10/1906 | Barry |
|---|---|---|
| 1,582,052 A | 4/1926 | Klages |
| 3,584,528 A | 6/1971 | Leblond |
| 3,732,767 A | 5/1973 | Habert |
| 3,817,141 A | 6/1974 | Simonetti |
| 3,848,501 A | 11/1974 | Kuts |
| 4,010,664 A | 3/1977 | Marshall |
| 4,210,042 A | 7/1980 | Felten |
| 4,406,201 A | 9/1983 | Barnes et al. |
| 4,409,872 A | 10/1983 | Bertoldo |
| 4,516,451 A | 5/1985 | Takeshita et al. |
| 4,567,797 A | 2/1986 | Folk |
| 4,607,558 A | 8/1986 | Giroux |
| 4,613,087 A | 9/1986 | Snyder |
| 4,656,910 A | 4/1987 | Peterson |
| 4,785,698 A | 11/1988 | Stork |
| 4,823,713 A | 4/1989 | Ogawa et al. |
| 4,922,774 A | 5/1990 | Oldeman |
| 5,156,516 A * | 10/1992 | Boisseau ................ 414/412 |
| 5,265,508 A | 11/1993 | Bell et al. |
| 5,317,943 A | 6/1994 | Dowdle |
| 5,613,414 A | 3/1997 | Murphy et al. |
| 5,638,732 A | 6/1997 | Becker et al. |
| 5,707,461 A | 1/1998 | Himuro |
| 5,707,470 A | 1/1998 | Rajala et al. |

FOREIGN PATENT DOCUMENTS

EP 0324199 7/1989

* cited by examiner

Primary Examiner—Allan N. Shoap
Assistant Examiner—Isaac Hamilton
(74) Attorney, Agent, or Firm—Howard M. Cohn

(57) ABSTRACT

A method and apparatus for cutting segments from a long sheet (1) of multilayered elastomeric material. An initial opening is formed in the sheet without severing reinforcing cords (20) within the elastomeric sheet by a penetrator/separator (40). Two ultrasonic knives are inserted on either side of the penetrator/separator (40) and positioned to cut the sheet at a small skive angle α with respect to the plane of the sheet being cut. Then the knives are moved to opposite edges of the sheet of elastomeric material.

13 Claims, 6 Drawing Sheets

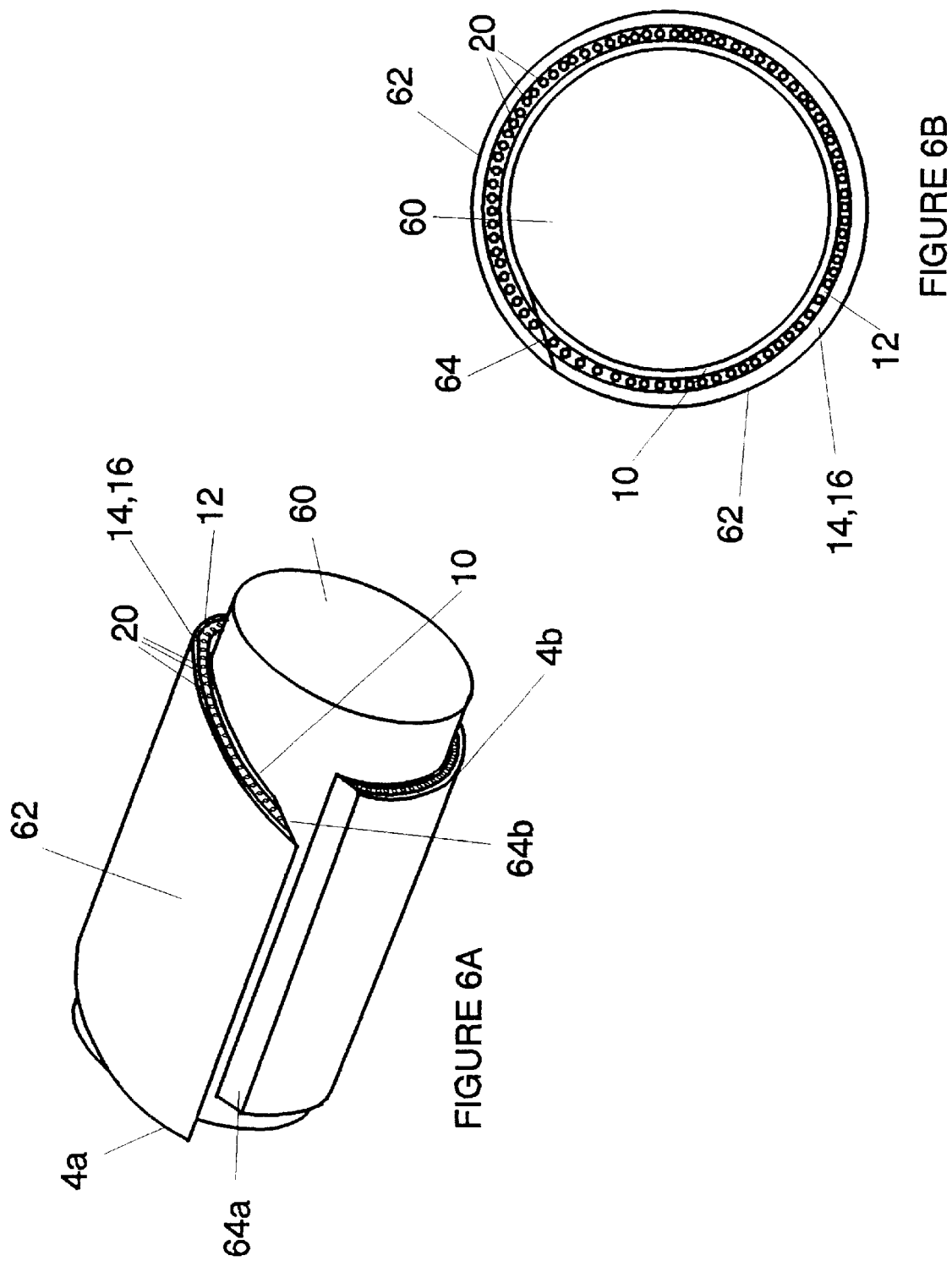

METHOD AND APPARATUS FOR CUTTING ELASTOMERIC MATERIALS

RELATED APPLICATION

This application is a Divisional Application of U.S. patent application Ser. No. 09/762,549 entitled METHOD AND APPARATUS FOR CUTTING ELASTOMERIC MATERIALS, filed on Feb. 8, 2001 by Hart et al, now U.S. Pat. No. 6,510,773 issued Jan. 28, 2003 which is a national stage of PCT/US98/225 filed Oct. 20, 1998.

BACKGROUND OF THE INVENTION

1. Technical Field

This invention relates to methods and apparatus for cutting elastomeric materials at low skive angles, in particular cutting layered composites of elastomeric materials including layers containing reinforcing materials.

2. Background of the Invention

Various methods and apparatus have been used for the cutting of sheets of elastomeric material. Such elastomeric material might consist of single sheets of homogeneous material, or multiple layered sheets of materials having properties that are different from one another. In the case of multiple layered sheets of elastomeric material that, for various reasons, need to be cut, one or more of the layers might contain reinforcing cords or fibers made of metal or fabric. Such reinforcing cords or fibers might be part of a woven reinforcing fabric, or they might be simply aligned in such a way as to be parallel to one another. Furthermore, the elastomeric materials that are to be cut may or may not be cured or vulcanized at the time of cutting.

Prior art cutting methods and apparatus include cutting wheels, ultrasonic cutters, scissor type cutters, guillotine knives, wire cutters and vibrating scroll cutters whose active cutting principle is a saw blade or a tensioned wire.

While such prior art cutting methods are effective to varying degrees, each as disadvantages. For example, the guillotine knife is somewhat effective in cutting composite elastomeric materials, but it has the disadvantage of having a tendency to deform the cut surfaces of the elastomeric material as the knife penetrates the material. Such deformation of the cut edge increases the difficulty of subsequent splicing the ends of the elastomeric material. Moreover, the guillotine knife produces a continually degraded cut surface as the blade becomes dull and/or as small pieces of elastomer began to build up on the blade. Yet another disadvantage was the inability of the blade to cut at an angle less than 30 degrees relative to the plane of the material being cut. The guillotine blade also tends to generate heat during the cutting process such that, as numerous cuts are made, the temperature of the knife becomes sufficiently elevated in some cases to induce precuring of unvulcanized elastomer in the region of the cut, which then inhibits subsequent proper splicing the cut edges.

Another prior art cutting system and method, disclosed in U.S. Pat. No. 5,638,732, employs a cutting wire. This system could not, however, be used to cut preassembled elastomeric composite sheets containing reinforcing cords because the reinforcing cords themselves, though aligned more or less parallel to the direction of the cut, get severed. This deficiency is actually inherent to nearly every prior art cutting technology (including ultrasonic knives) that cut composite elastomeric preassemblies at relatively low skive angles. That is to say, nearly all prior art cutting methods tended to cut the parallel-aligned cords that are used to reinforce one or more layers of reinforced ply. (The cut is, ideally, intended to be made between the parallel-aligned reinforcing cords.) The only prior art exception being the scroll cutter, which could cut at low skive angles without also risking cutting the reinforcing cords.

The scroll cutter cannot, however, initiate its cut within the central region of a sheet of preassembled composite elastomeric sheets, because of its geometry, which includes a wire held at each end by a fixture. The scroll cutter must start its cut from the side of the preassembly, such that the cutting has difficulty entering the ply without splitting the reinforcing cords. Even at a 90 degree skive angle, the reliability of not splitting cords is in question. At low skive angles it becomes exponentially difficult to enter the ply without splitting a ply cord. Sometimes the reinforced ply end will be buried under the other layers, such as, in the case of tire manufacturing, the sidewall layer or other layers such as the extreme edge of the preassembly within the context of envelope construction. This adds another dimension of difficulty for the wire scroll cutter to cut reliably preassembly with reinforced layers, such as specifically the ply of tires.

Ultrasonic cutting systems as disclosed in U.S. Pat. No. 5,265,508, can cut stock material at low skive angles. However, they require that the material be secured to an anvil during cutting.

Another system, disclosed in U.S. Pat. No. 4,922,774, employs an ultrasonic cutting device which vibrates a knife that moves across an elastomeric strip. However, this system is limited to cutting angles of between 10 and 90 degrees, and it does not provide for cutting between parallel disposed, reinforcement cords within the strip, which is to say, the cords can get cut.

A significant problem with the prior art cutting systems and methods is the inability to cut at angles less than 30 degrees relative to the plane of the elastomeric layers being cut without deformation or precuring the material. This can be a problem in, for example, automated tire building operations wherein the cutting has to be done precisely and quickly and where the cutter can also provide improvements to the cut surface which is subsequently to be spliced.

An ideal cutting method and apparatus should be able to make cuts at low angles (relative to the plane of the elastomeric sheet being cut), and it should be able to do so without cutting the parallel-aligned reinforcing cords between which the cutter is ideally to move. It should also be able to make these low angle cuts rapidly and reliably.

OBJECTS OF THE INVENTION

It is an object of the present invention to provide method and apparatus for cutting single or multilayered flat sheets of elastomeric materials, one or more layers of which are reinforced with cords which are aligned parallel to one another and oriented in the direction of the cut, the method and apparatus being as defined in one or more of the appended claims and, as such, having the capability of being constructed to accomplish one or more of the following subsidiary objects.

One object of the present invention to provide a method and apparatus for cutting segments of cord-reinforced elastomeric material from long, multilayered flat sheets of cord-reinforced elastomeric material, such method and apparatus overcoming the disadvantages and limitations of the prior art methods and devices.

Another object of the present invention to provide a method and apparatus for cutting segments of material from long multilayered flat sheets of cord-reinforced elastomeric material without cutting the reinforcing cords that are more or less aligned with the direction of the cut.

It is another object of the present invention to provide a method and apparatus for cutting segments of material from long multilayered flat sheets of cord-reinforced elastomeric materials by initiating the cut at a location that is between the lateral edges of the sheet of elastomeric material.

Yet another object of the present invention to provide a method and apparatus for initiating the cutting segments of material from multilayered flat sheets of cord-reinforced elastomeric materials without cutting the reinforcing cords.

Another object of the present invention to provide a method and apparatus for cutting segments of material from long multilayered flat sheets of cord-reinforced elastomeric materials by the controllable penetration of the cutting knifes such as to perform the cutting in a such a way that intentionally dulled edges of the cutting knives are in close proximity to the reinforcing cords, thereby protecting the reinforcing cords from being cut.

Another object of the present invention is to provide a method and apparatus for cutting segments of material from long multilayered flat sheets of cord-reinforced elastomeric materials at skive or cutting angles that can be varied between angles of about 5 degrees and about 40 degrees with respect to the plane of the sheet.

Still another object of the present invention to provide method and apparatus for cutting segments of material from long multilayered flat sheets of cord-reinforced elastomeric materials at skive angles or cutting angles that can be controllably varied between about 5 degrees and about 40 degrees with respect to the plane of the sheet at the beginning of the cutting operation; and Finally another object of the present invention to provide method and apparatus for cutting segments from long multilayered flat sheets of cord-reinforced elastomeric materials at skive or cutting angles which can be varied between angles of about 5 degrees and about 40 degrees with respect to the plane of the sheet during the cutting operation.

SUMMARY OF THE INVENTION

The invention herein described is a method for cutting segments of elastomeric material from a long sheet of multilayered elastomeric material, at least one layer of which contains parallel aligned reinforcing cords. The cutting method employs the use of a penetrator/separator and two ultrasonic knives of a double-edged, stiletto type. The penetrator/separator makes an initial opening in the sheet of elastomeric material, penetrating it while separating, without severing, the reinforcing cords. The tip of the penetrator/separator can be heated to facilitate penetration, and the tip is blunt or dulled to minimize the potential for severing the parallel-aligned, reinforcing cords. The sides of the penetrator/separator are tapered so that the opening created in the elastomeric sheet can be controllably widened according to the depth to which the penetrator/separator is inserted into and through the opening it creates. The initial penetration is made at some location inwards of the two sides of the sheet being cut. The penetrator/separator is initially substantially perpendicular to the sheet being penetrated. After the opening is made in the elastomeric sheet, the two ultrasonic knives are inserted into the opening, one on either side of the penetrator/separator. The two knives might be inserted into the opening before they and the penetrator/separator are angularly reoriented to an angle of less than 90 degrees, i.e. between 5 degrees and 40 degrees, with respect to the plane of the elastomeric sheet being cut, or the two knives might be inserted into the opening after the penetrator/separator has been angularly reoriented to an angle of less than 90 degrees with respect to the plane of the elastomeric sheet being cut. The ultrasonic knives, after insertion and angular adjustment, make the cut by moving apart from one another and from the penetrator/separator. The skive angle or cutting angle of the knives can be adjusted during the cutting process, each knife independently of the other or in concert with the other. The skive angle of each knife is adjustable between about 5 degrees and about 40 degrees within the plane perpendicular to the direction of the cut. The depth to which each ultrasonic knife is inserted into the elastomeric sheet is controllable. The tip of each ultrasonic knife blade is dulled to minimize the potential for cutting of the parallel-aligned reinforcing cords most adjacent to the line along with the cut is being made.

Other benefits and advantages of the invention will become apparent to those skilled in the art to which it pertains upon a reading and understanding of the following detailed specification.

BRIEF DESCRIPTION OF THE DRAWINGS

The structure, operation, and advantages of the invention will become further apparent upon consideration of the following description taken in conjunction with the accompanying drawings, wherein:

FIG. 6A is an oblique schematic view of a piece of multilayered elastomeric material being wrapped around a tire building drum; and FIG. 6B is an orthogonal, end-on view of the building drum shown in FIG. 6A.

DEFINITIONS

"Bead" or "Bead Core" generally means that part of the tire comprising an annular tensile member of circumerentially wound wires or cables associated with holding the tire on a wheel rim.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Insert" means the crescent- or wedge-shaped reinforcement typically used to reinforce the sidewalls of runflat-type tires; it also refers to the elastomeric non-crescent-shaped insert that underlies the tread.

"Ply" means a cord-reinforced layer of elastomer-coated, radially deployed or otherwise parallel cords.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Sidewall" means that portion of a tire between the tread and the bead.

"Skive" or "skive angle" refers to the cutting angle of a knife with respect to the material being cut; the skive angle is measured with respect to the plane of the flat material being cut.

"Tread Cap" refers to the tread and the underlying material into which the tread pattern is molded.

"Wedge Insert" means the same as "Insert."

DETAILED DESCRIPTION OF THE PREFERRED EMBODIMENT

Figure 1:
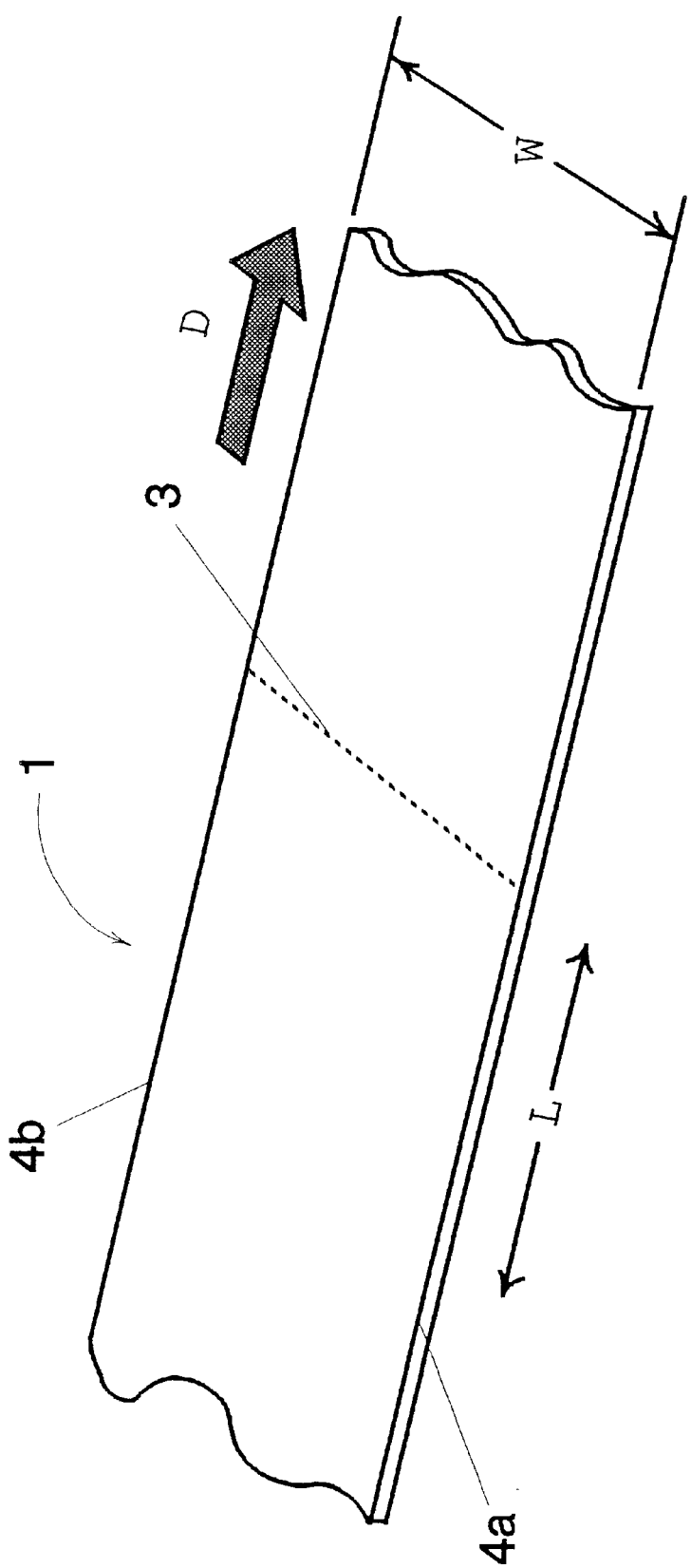
FIG. 1 is a schematic view of a conveyor conveyed multilayered sheet of elastomeric material, showing the location of the cut to be made.

With reference to FIG. 1, a sheet 1 of elastomeric material is illustrated in oblique view. The sheet 1 has a width W and an indefinite length designated by the L direction. The sheet 1 is transported upon a conveyor means (not shown) in the direction D. The sheet 1 comprises one or more elastomeric layers. The dotted line 3 shows the location of a lateral cut that is to be made across the width of the sheet 1 of elastomeric material. The conveyor system (not shown) which supports the sheet 1 does not convey the sheet during the cutting process, but rather only supports the sheet during this operation.

Figure 2:
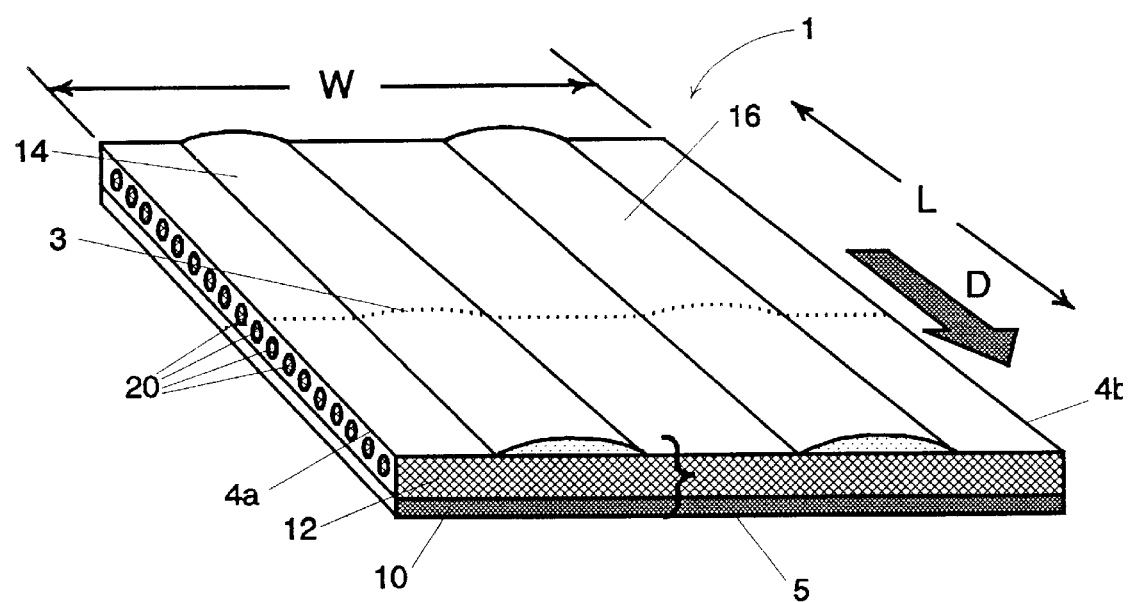
FIG. 2 is a detailed view of one type of layered structure of the elastomeric sheet shown in FIG. 1.

FIG. 2 is a cross-sectional view of a sheet 1 of a multilayered elastomeric material, comprising three layers 5. That is, FIG. 2 shows a not-to-scale schematic view of the structural details of a typical elastomeric sheet 1 of the sort shown generally in FIG. 1. The layers 5 includes, in FIG. 2, an innerliner elastomeric layer 10, a cord-reinforced elastomeric ply layer 12, and two spaced-apart sidewall layers 14 and 16. Reinforcing cords 20 are located within the ply layer 12. The reinforcing cords 20 are disposed essentially parallel to one another, and are oriented at right angles to the respective sides 4a and 4b of sheet 1 of the layered elastomeric shown in FIGS. 1 and 2. In other words, the reinforcing cords 20 of the ply layer 12 are oriented laterally across the width W of the plane of the sheet 1 of the layered elastomeric material, and are perpendicular to the direction L and parallel to the direction of line 3 along which the cut will be made.

One of the challenges faced in cutting such a sheet of elastomeric material is to make the cut in such a way so as not to cut any of the ply reinforcing cords 20. Worth noting in this regard is that the reinforcing cords 20 might not be accessible to direct view from the edge-on view as shown in FIG. 2, which is to say, the otherwise exposed ends of the reinforcing cords might actually be covered with other materials or elastomeric layers at the edges of the sheet 1 shown in FIG. 2. The fact that the reinforcing cords 20 might not be visible when viewed from the edge of the sheet 1 works against initiating the cutting process at one of the edges 4a or 4b for two reasons: (1) such an edge-initiated cut might sever an underlying reinforcing cord; and (2) the process of initiating the cut at the edge, even if the reinforcing cords are not cut, has the potential to disrupt the lay of the reinforcing cords in such a way as to adversely affect the quality of the final product that is subsequently manufactured from the cut sheet of elastomeric material. With special regard to the latter possibility (of deforming the edge of the material being cut), the cut can be initiated, such that the least effect on the quality of the final product, at a specific location inward of the edges 4a, 4b of the elastomeric sheet. Which is to say, flaws resulting from the initiation of the cut can more easily be accommodated within the final product if the cut is initiated somewhere along the dotted line 3 that is inward of the edges 4a, 4b.

Accordingly, the cutting method achieved by the present invention involves an initial penetration of the elastomeric sheet by means of a penetrator/separator 40, which separates the two mutually adjacent reinforcing cords 20 that are closest to the point of penetration. The penetrator/separator 40 is discussed in more detail below.

Figure 3A:
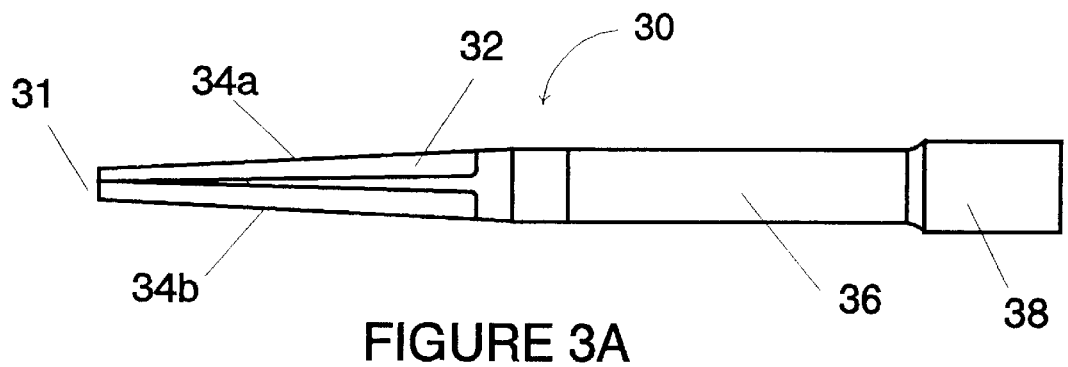
FIG. 3A is a side view of an ultrasonic cutting knive.
Figure 3B:
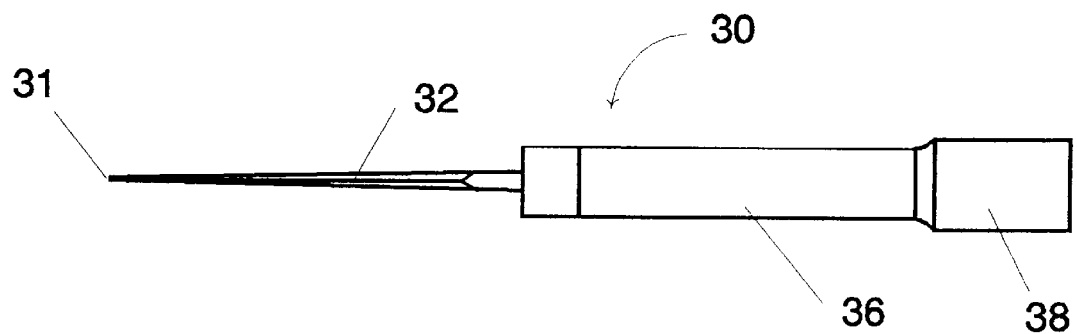
FIG. 3B is an edge view of an ultrasonic cutting knive.
Figure 4:
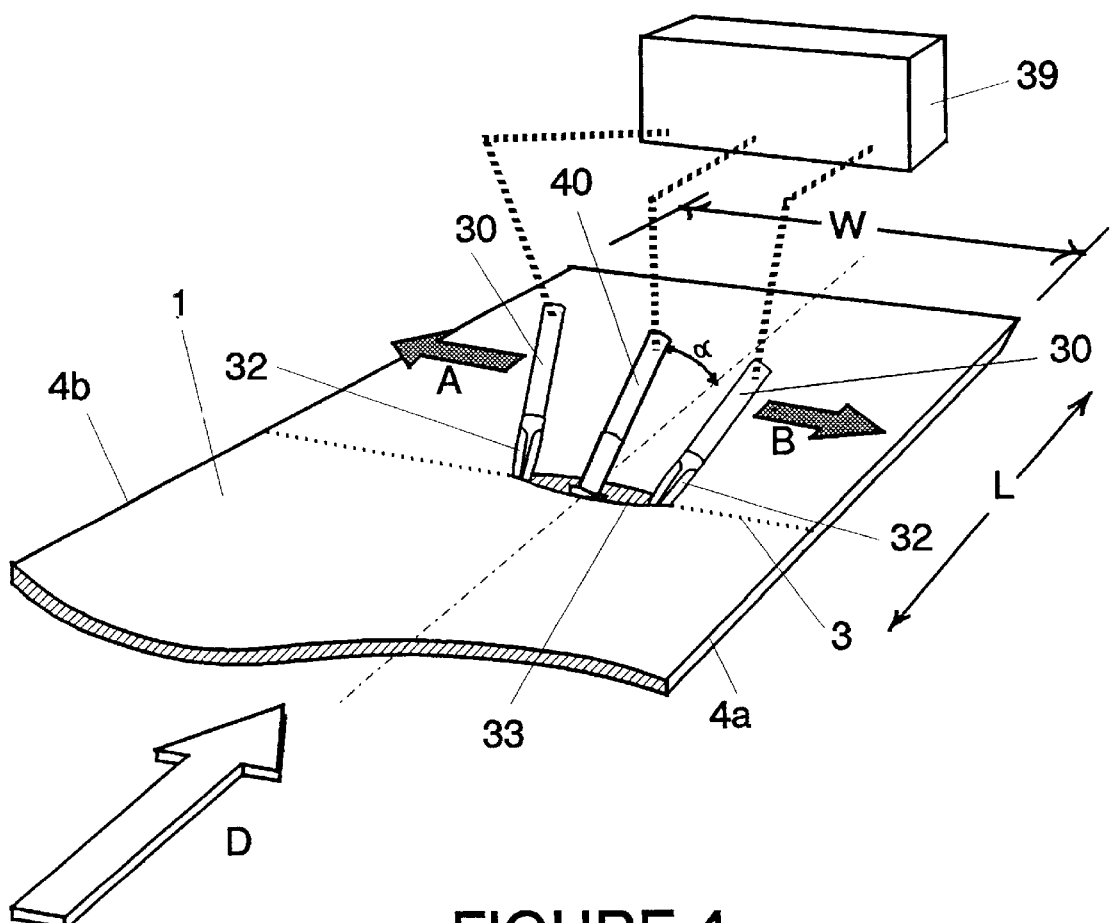
FIG. 4 shows an elastomeric sheet with two cutting knives located on either side of the penetrator separator.

FIGS. 3A and 3B show two views of a double-bladed, stiletto-type ultrasonic knife assembly 30, comprising a blade 32 having two opposing cutting edges 34a, 34b, a supporting handle 36 and a shank 38 that attaches to a computer controlled mechanical knife holder 39 that also conveys ultrasonic energy to the knife blade 32. The computer-controlled mechanical knife holder 39, the details of which do not form a part of the present invention, also holds and controls the penetrator/separator 40, which is shown in FIG. 4; the computer-controlled knife and penetrator holder controls the translational and angular motions of the knives and the penetrator/separator, as well as the cutting depth to which the knives reach into the elastomeric material. FIG. 3A shows the blade 32 from a side-on view; FIG. 3B shows the blade 32 edge-on. The edges 34a, 34b of the portion of the blade 32 near the tip or "horn" 31 are dulled for reasons that will be described below.

Sequence of the Cutting Operation

Figure 5A:
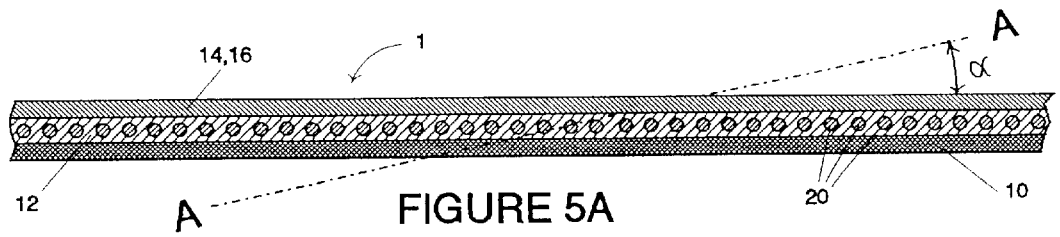
FIG. 5A is an edge view of an elastomeric sheet, demonstrating the skive angle of the cut.
Figure 5B:
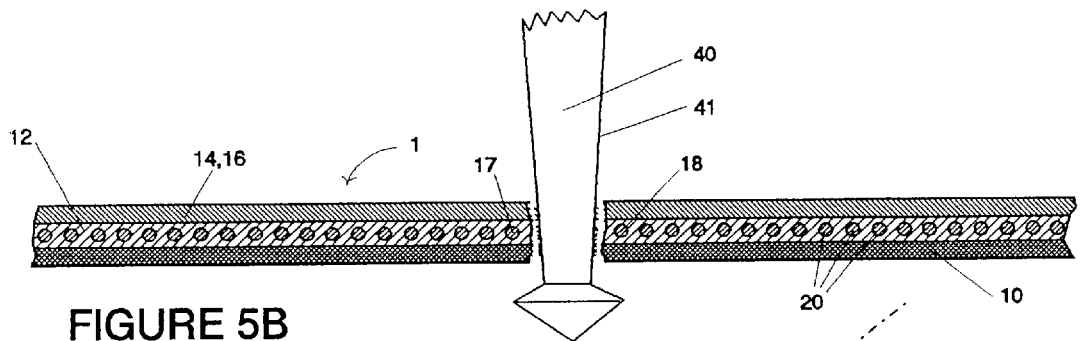
FIG. 5B is an edge view of an elastomeric sheet having been penetrated by a penetrator/separator.
Figure 5C:
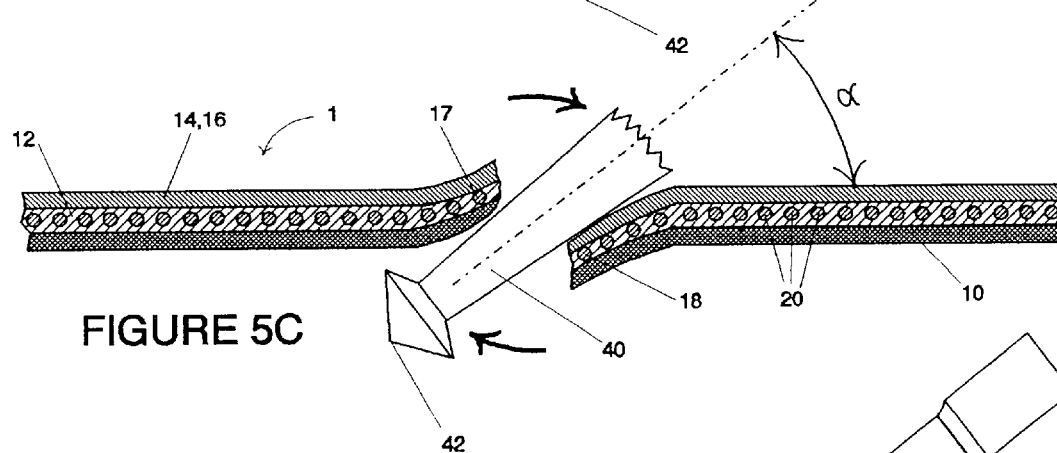
FIG. 5C is an edge view of an elastomeric sheet in which the penetrator/separator has been angularly positioned to less than 90 degrees with respect to the plane of the sheet.

Referring now to FIG. 4, an elastomeric sheet 1 is shown being cut. The cutting process takes place while the sheet 1 is held in place and stationary by the conveyor system (not shown) upon which the sheet has been transported into position prior to cutting. The cutting process is initiated by inserting the penetrator/separator 40 through the elastomeric sheet 1, thereby piercing it. The penetrator/separator 40 has a dulled, heated tip which allows penetration of the sheet 1 in such a way that the embedded reinforcing cords that are most adjacent to the point of penetration are separated without being severed by the penetrator/separator 40. FIG. 5B shows the penetrator/separator 40 from a direction that corresponds to an edge-on view of the sheet 1 being cut. Adjacent cords 17, 18 are separated without being cut by the penetrator/separator 40. Evident also in FIGS. 5A, 5B, 5C, 5D (5A–5D) are the tapered sides 41 and heated tip 42 of the penetrator/separator 40.

Referring to FIG. 4, two ultrasonic knives 30 are inserted through the opening 331 one blade each on either side of the penetrator/separator 40. The penetrator/separator 40, having tapered sides, can be inserted into the opening 33 to a depth that creates an opening of sufficient width for the knives to be inserted. The now inserted knives 30 then make their respective cuts at a skive angle α. The skive angle α shown in FIGS. 4 and 5A is the actual cutting angle, as measured between each knife's axis and the plane of the elastomeric sheet 1. More specifically, the skive angle α is the cutting angle as measured inside of the plane that is perpendicular to the direction of the cut being made, and it is the angle between the cutting edges of each knife and the plane of the sheet of material being cut. Once the inserted knives are angularly oriented to the desired skive angle α, the cutting can thence proceed as the two mechanically controlled ultrasonic cutting blades are moved away from one another along the line 3 which defines the direction of the desired cut.

Referring to FIGS. 5A through 5B, once the initial penetration has taken place and the two reinforcing cords 17, 18 that are closest to the point of penetration, and which lie on either side of the point of penetration, have been pushed aside or separated (FIGS. 5B and 5C), the cutting blades 32 of the ultrasonic knives 30 can then be inserted on either side of the point of the initial penetration. However, after the initial penetration has taken place and before the cutting begins, consideration must be made for achieving the proper skive angle or cutting angle α. The skive angle or cutting angle α can vary between about 5 and about 40 degrees, even though the initial penetration of penetrator/separator 40 is made at an angle that is close to perpendicular to the sheet 1 of elastomeric material. More preferably the skive angle α is between about 5 degrees and about 20 degrees.

The actual cutting operation can follow one of two sequences after the initial penetration has been made by the penetrator/separator 40.

Figure 5D:
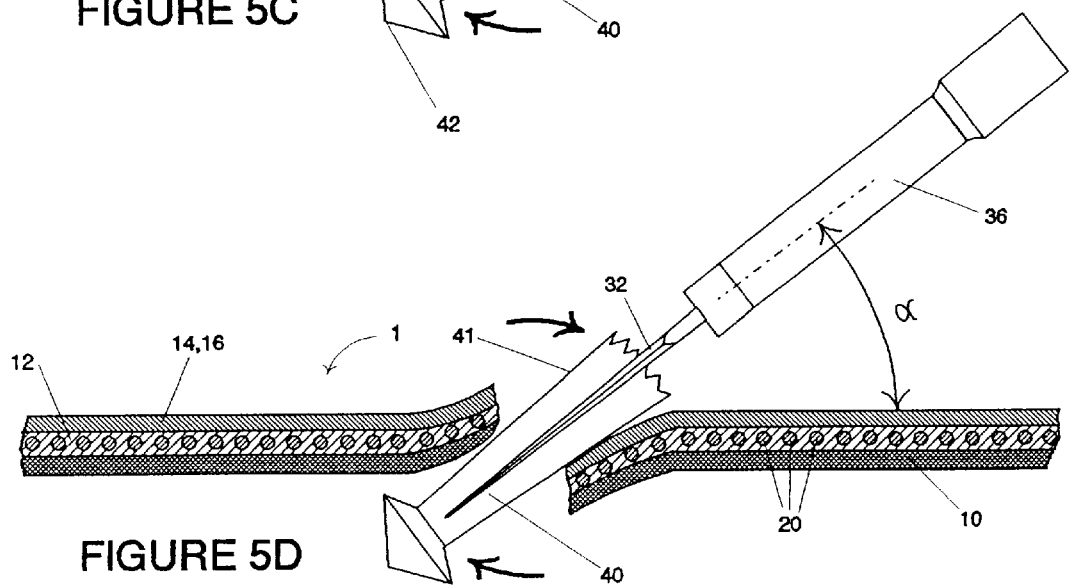
FIG. 5D is an edge view of an elastomeric sheet in which the penetrator/separator has been angularly positioned to less than 90 degrees with respect to the plane of the sheet and a knife has been inserted beside the penetrator/separator.

Referring to FIG. 5B, the penetrator/separator 40 is initially oriented more or less at right angles to the plane of the sheet 1. Accordingly, there are two methods by which to orient the cutting blades 32 prior to initiation of cutting at the desired skive angle α are:

Method 1—The penetrator/separator 40, after having penetrated the sheet 1 at more or less right angles, can be oriented to the desired angle α, as shown in FIG. 4C, after which the blades 32 of the ultrasonic knives 30 can be inserted; or Method 2—The blades 32 of the ultrasonic knives 30 can be inserted at an orientation that is more or less perpendicular to the plane of the sheet 1, and then the combination of the two knives and the penetrator/separator 40 can be simultaneously oriented to the skive angle α, as shown in FIGS. 4 and 5D.

By whichever method of knife insertion and orientation to the desired skive angle α, the two ultrasonic knives 30, after insertion into the opening 33, are moved apart from one another along the cutting line 3 shown in FIGS. 1, 2, and 4.

The cut is thus made at the desired skive angle, with the cut having been initiated at such a location as will cause minimal disruption of the structure of the elastomeric sheet 1, thereby having the least adverse effect on the quality of the final product that is to be manufactured from the cut sheet.

The penetrator/separator 40 is maintained in its location and skive angle orientation throughout the cutting process in order to hold the cut edges and the underlying reinforcing cords 20 apart from one another during the cutting process.

The Dulled Tips of the Cutting Blades

More or fewer than three layers might constitute a particular layered elastomeric sheet 1 that is to be cut in the lateral direction shown by the dotted line 3 in FIGS. 1 and 2. FIGS. 1 and 2 show a specific example of a three-layered type of multilayered elastomeric material that is to be cut. In particular, the types of elastomeric sheet 1 that are to be cut will have an indefinite length L and has some definite width W. In addition, the elastomeric sheet is fed along a conveyor system (not shown) in the direction D, and the sheet is stopped periodically to allow the widthwise cut along the line 3.

FIGS. 3A and 3B, which show, respectively, the side and edge-on views of an ultrasonic cutting-knife assembly 30 illustrate the stiletto nature of the cutting blade 32. The stiletto nature of the blades allows the cutting process to take place in such a way that the cut material can "flow" around the blade, thereby inducing the least amount of distortion in the cut edge of the elastomeric material. Each ultrasonic knife assembly 30 attaches by means of the shank 38 into the chuck (not shown) of a conventional computer-controlled machine (not shown) that delivers ultrasonic energy to the knife and controls the cutting angle of the knife and the translational motion of the knife as each blade 32 progresses edgewise along the direction of the cut. However, the tip or horn 31 of the knife blade 32 is dull compared to other parts of the cutting blade. This relative dullness relates to the depth to which each cutting blade 32 is inserted into and through the sheet 1 of the elastomeric material; more specifically, each knife is inserted to such a depth that the dulled part of the tip or horn 31 of the blade will be closest to the depth location within the elastomeric material wherein lie the reinforcing cords 20. In other words, the dulled part of the tip 31 of the blades will be in the region of the elastomeric material that contains the reinforcing cords, and the dulled blade will be less likely to sever the reinforcing cords 20 during the cutting process. Thus a point worth noting about this invention: the depth to which each cutting blade can be inserted into and through the elastomeric material is, like the skive angle and the cutting speed, controllable by means of the computer-controlled mechanical device that holds and controls the blades and the penetrator/separator and which conveys ultrasonic energy to the cutting knives.

The depth to which the knives 30 are inserted into the elastomeric material 1 are controllable independently of one another during the cutting process.

Controlling the Skive Angle

The cutting challenges addressed by the present invention include the above-mentioned presence of the reinforcing cords 20 and the varying thickness of the elastomeric layers, such as the sidewall layers 14 and 16 shown in FIG. 2. One goal of the present invention is to cut the layered elastomeric sheet 1 without cutting the parallel-aligned reinforcing cords 20 which are oriented more or less in the direction of the cut that is to be made. Additionally, the cut is to be made at a small skive angle α, for reasons described below.

The skive angle α is shown in FIG. 5A, which shows a cross-sectional edge-on view of a sheet 1 of layered elastomeric material; i.e., the skive angle α is the cutting angle between the plane of sheet 1 and the line A—A. Incidentally, the views shown in FIGS. 5A–5D correspond to the direction of the reinforcing cords 20, which is also the direction of the cut; in other words, the direction of the cut is perpendicular to the plane of the FIGS. 5A–5D. Accordingly the angle which each of the two knife blades 30 has with the plane of the elastomeric material, during the cutting process, is the skive angle α of that blade. The skive angle α is between about 5 degrees and about 40 degrees and the skive angle of each blade is independently variable of the other blade during the cutting process. That is, the controller machine (not shown) which holds the cutting two knives is able to control the skive angles of each knife during the cutting process independently of one another.

Small skive angles α create a large surface in the cut face of the elastomeric material. Such a large surface area is important in the final use to which the cut elastomeric material is to be put; specifically, each cut piece of elastomeric material is to be wrapped around a tire-building drum in such a way that the respective severed edges can be brought together in a way that allows them to be spliced along a large contact area as shown schematically in FIGS. 6A and 6B.

While FIGS. 5A through 5D show three layers of elastomeric material in the sheet 1 (as also shown in FIG. 2), more than three or fewer than three layers might also be at issue in some types of sheets of elastomeric material that are to be cut. FIG. 5B shows the penetrator/separator 40, the tip of which is blunt and heated, after it has been pushed through the elastomeric material without cutting the reinforcing cords 20. As shown in FIG. 4, the penetrator/separator 40 penetrates the multi-layered elastomeric sheet 1 at some location inward of the edges 4a and 4b. The blunt end of the penetrator/separator 40 is designed to push aside, or separate, the adjacent reinforcing cords 20 between which the initial penetration takes place. The tapered sides 41 of the penetrator/separator allow the penetrator/separator to be controllably inserted so as to controllably widen the gap 33 into which the knives 30 are to be inserted.

FIG. 4 shows the ultrasonic knife assemblies 30 inserted into the opening 33 created by the penetrator/separator 40 in the elastomeric sheet 1. Penetrator/separator 40 is shown in the location where the initial penetration has taken place within the sheet 1. The knife assemblies 30 are thence inserted on either side of the penetrator/separator 40, as shown, and thence moved laterally apart from one another in the directions indicated by the arrows A and B. Arrow C indicates the direction of movement of the elastomeric sheet, prior to and after the cutting process, along the conveyor system (which is not shown and which is not in motion during the cutting process). The skive angle α is also shown.

While the initial angle of piercing by the penetrator/separator 40 is about 90 degrees to the plane of the sheet 1, the goal of the invention is to make the cut at a small skive angle α. The reason for the small skive angle α relates to the subsequent manufacturing step, mentioned above, in which the cut ends of the multilayered elastomeric sheets are to be spliced together. The nature of the splicing is illustrated in FIGS. 6A and 6B. FIG. 6A shows a cut sheet 62 wrapped around a tire-building drum 60. The respective cut edges 64a, 64b, i.e., the edges which have been cut at a low skive angle α, can be joined or spliced along a larger surface area of contact than would be possible had the cut been made at a steep skive angle α. FIG. 6B shows the tire-building drum 60 end-on, with the cut sheet of elastomeric material 62 wrapped around it and the cut ends spliced together at location 64.

Adjustment of the skive angle a during the cutting process is an additional feature of this invention. That is to say, the invention anticipates that cuts might be made at steeper angles a at certain locations along the cutting line 3 shown in FIGS. 1, 2 and 4. For example, referring to FIG. 2, the skive angle α might be larger in the thicker regions of the sheet 1 where the sidewall layers 14, 16 are located, than in the locations where the sheet is thinner. Larger skive angles α in such thicker locations will still provide large areas of contact when the respective ends of the cut sheet is wrapped around the tire building drum of the sort shown in FIGS. 6 and 6B.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A method for cuffing segments from a long sheet of multilayered elastomeric material containing reinforcing cords that are substantially parallel to one another and oriented in the general direction of a cut line, the method including the steps of:
   penetrating the sheet and making an opening with a penetrator/separator;
   inserting two ultrasonic knives into the opening, one on either side of the penetrator/separator;
   moving the knives apart from the penetrator/separator and apart from one another in opposite directions along the cut line of the cut being made; and
   cutting the segments at a desired skive angle α.

2. The method of claim 1 including the step of penetrating into the sheet with a heated tip of the penetrator/separator.

3. The method of claim 2 including the step of inserting the ultrasonic knives into the opening created by the penetrator/separator prior to the angular reorientation of the penetrator/separator to an angle of less than 90 degrees.

4. The method of claim 1 including the step of penetrating the sheet with the penetrator/separator having tapered sides.

5. The method of claim 4 including the step of cutting the sheet with the two opposing cutting edges of the ultrasonic knives.

6. The method of claim 1 including the step of controlling the skive angle α of the ultrasonic knives before initiation of the cutting step.

7. The method of claim 6 including the step of controlling the skive angles α of the ultrasonic knives during the cutting step.

8. The method of claim 7 including the step of controlling the respective skive angle α of the each ultrasonic knife independently of the other during the cutting step.

9. The method of claim 1 including the step of controlling the depth of penetration of the penetrator/separator.

10. The method of claim 1 including the step of controlling the respective depths of penetration of the ultrasonic knives.

11. The method of claim 1 including the step of controlling the angle of the penetrator/separator subsequent to the step of penetrating the sheet of elastomeric material to between about 90 degrees and about 5 degrees.

12. The method of claim 1 including the step of inserting the ultrasonic knives into the opening created by the penetrator/separator subsequent to the angular reorientation of the penetrator/separator to an angle of less than 90 degrees.

13. The method of claim 1 including the step of penetrating into the sheet with a dulled tip of the penetrator/separator.

* * * * *